United States Patent
Park

(10) Patent No.: US 6,850,842 B2
(45) Date of Patent: Feb. 1, 2005

(54) NAVIGATION SYSTEM FOR PROVIDING REAL-TIME TRAFFIC INFORMATION AND TRAFFIC INFORMATION PROCESSING METHOD BY THE SAME

(75) Inventor: Hee-Do Park, Uijongbu-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/270,960

(22) Filed: Oct. 15, 2002

(65) Prior Publication Data

US 2003/0083813 A1 May 1, 2003

(30) Foreign Application Priority Data

Oct. 31, 2001 (KR) .................................. P2001-0067696

(51) Int. Cl.$^7$ .............................................. G01C 21/34
(52) U.S. Cl. ...................................... 701/210; 701/209
(58) Field of Search ................................ 701/210, 209, 701/211, 213, 200, 117; 340/995.19, 990

(56) References Cited

U.S. PATENT DOCUMENTS 6,297,748 B1 * 10/2001 Lappenbusch et al. ...... 340/905
6,615,130 B2 * 9/2003 Myr ............................ 701/117
6,615,131 B1 * 9/2003 Rennard et al. ............. 701/200
2001/0001848 A1 * 5/2001 Oshizawa et al. ........... 701/210

* cited by examiner

Primary Examiner—Marthe Y. Marc-Coleman
(74) Attorney, Agent, or Firm—Dilworth & Barrese LLP

(57) ABSTRACT

Disclosed is a navigation system for providing real-time traffic information to users connected thereto through a communication network and a traffic information processing method by such a system. The processing method for using real-time traffic information for calculating a travel route in a navigation system according to the present invention includes the step of receiving acquired traffic information and creating traffic information based on first map data. The processing method also includes the steps of converting the created traffic information into a second map data format different from a first map data format, and causing the format-converted traffic information to be reflected in the second map data and thus enabling an optimal travel route, based on the second map data in which the acquired traffic information is reflected, to be calculated when the travel route is requested.

16 Claims, 6 Drawing Sheets

INFORMATION CENTER(100)
• MAP DATA
• REAL-TIME TRAFFIC INFORMATION

NAVIGATION SYSTEM FOR PROVIDING REAL-TIME TRAFFIC INFORMATION AND TRAFFIC INFORMATION PROCESSING METHOD BY THE SAME

PRIORITY

This application claims priority to an application entitled "Navigation System For Providing Real-Time Traffic Information and Traffic Information Processing Method By The Same" filed in the Korean Industrial Property Office on Oct. 31, 2001 and assigned Ser. No. 2001-67696, the contents of which are herein incorporated by reference.

BACKGROUND OF THE INVENTION

1. Field of the Invention

The present invention relates to a navigation system for providing real-time traffic information to users connected thereto through a communication network and to a traffic information processing method by such a navigation system.

2. Description of the Related Art

In general, a navigation system displays the current location of a moving object on a map shown in a display screen, that location being calculated using information received from Global Positioning System (hereinafter referred to as "GPS"). The navigation system also provides drivers with various navigation information required for driving by displaying a travel direction of the moving object, a distance to a destination to go to, the current travel speed of the moving object, a route set by the driver before driving, the best route to the destination and so forth. Such a navigation system (or GPS positioning system) is presently mounted to a variety of moving objects such as ships, air planes, vehicles, etc. and is widely used for confirming the current location and the current speed of the moving object or for determining the travel route. The navigation system, in particular, receives a radio wave indicating latitude, longitude, altitude and the like from a plurality of artificial satellites belonging to the GPS, calculates them, and then visually shows map information including the current location to the driver or audibly notifies the driver of that information.

A typical navigation system is realized in a form of one terminal. The typical navigation system has a storage medium such as a CD ROM (Compact Disc Read Only Memory) in which map data is stored and a GPS receiver for receiving GPS signals. This typical navigation system is very expensive, which imposes a heavy burden on users thereof. A recent navigation system, which has been developed in order to get rid of such an economic burden, is characterized in that it has a storage medium for storing map data and includes an information center which calculates an optimal travel route, creates route guidance data in accordance with the calculated result and provides that data to a subscriber when there is a demand for navigation function from the subscriber. The route guidance data created by the information center is provided to a mobile terminal such as a cellular phone through a communication network (e.g., wireless network) and is displayed on a display window (liquid crystal display) of the terminal.

On the other hand, the typical and the recent navigation systems have developed into a type reflecting real-time traffic information as well as providing the travel route information on the basis of the map data stored in the storage medium. The recent navigation system, for example, has a travel route server and a traffic information server in a server system such as an information center by which route guidance data for guiding an optimal travel route is created and the created data is provided to subscribers through a network.

In this navigation system which calculates the travel route reflecting the real-time traffic information, there is no problem when a format of map data for calculating the travel route is the same as that of map data for representing the traffic information. When either map data is converted or processed for upgrading, however, the user faces a serious situation in which it is impossible to calculate the optimal travel route reflecting the real-time traffic information unless the other map data is converted or processed for upgrading. Above all, this problem is incurred in a case when there exists one format of the map data for representing the traffic information and there exist plural formats of the map data for calculating the travel route like in a case when there is a single provider of the real-time traffic information and there are multiple providers of the map data for calculating the travel route.

SUMMARY OF THE INVENTION

Accordingly, the present invention has been made to solve the above-mentioned problems occurring in the prior art, and an object of the present invention is to provide a navigation system which can calculate an optimal travel route even in a case when the format of map data for representing real-time traffic information is different from that of map data for calculating a travel route and a method for processing traffic information by such a navigation system.

Another object of the present invention is to provide a navigation system which can cause the real-time traffic information to be reflected in the respective map data formats even in a case when there are plural formats of the map data for calculating the travel route and a method for processing traffic information by such a navigation system.

In order to accomplish these objects, there is provided a processing method for using real-time traffic information for calculating a travel route in a navigation system in accordance with one aspect of the present invention, the method comprising the steps of: receiving acquired traffic information and creating traffic information based on first map data; converting the created traffic information into a second map data format different from the first map data format; and causing the format-converted traffic information to be reflected in the second map data and thus enabling an optimal travel route, based on the second map data in which the acquired traffic information is reflected, to be calculated when the travel route is requested.

In accordance with another aspect of the present invention, there is provided a processing method for using real-time traffic information for calculating a travel route in a navigation system, the method comprising the steps of: receiving acquired traffic information and creating traffic information based on first map data; converting the created traffic information into a standard map data format; converting the traffic information, which is converted into the standard map data format, into a second map data format different from the first map data format; and causing the traffic information, which is converted into the second map data format, to be reflected in the second map data and thus enabling an optimal travel route, based on the second map data in which the acquired traffic information is reflected, to be calculated when the travel route is requested.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
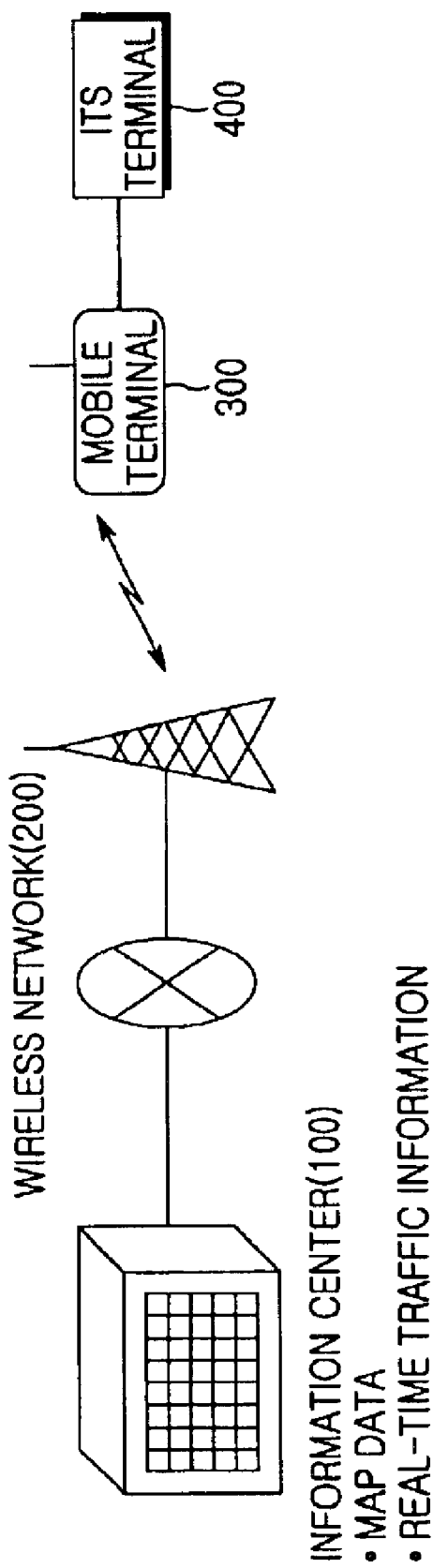
FIG. 1 is a schematic constructional view of a navigation system to which the present invention is applied.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may obscure the subject matter of the present invention.

Navigation systems in accordance with preferred embodiments of the present invention, which will be described below, are characterized in that they provide real-time traffic information and can calculate an optimal travel route reflecting the traffic information even when a format of map data for representing the traffic information is different from that of map data for calculating the travel route. This characteristic of the present invention can be achieved on a information center side of a navigation system consisting of an information center, a wireless network, a mobile terminal and a ITS terminal as described below. Note that, as another example, the above-mentioned characteristic of the present invention can be also achieved in a typical navigation system which is provided with the real-time traffic information by radio or cable.

Now, a description will be given for the above-mentioned characteristic of the present invention by way of two embodiments. A first embodiment is realized by converting the traffic information based on first map data into a format of second map data, which is used for calculating the travel route and has different format from that of the first map data, and causing the traffic information to be reflected in the calculation of the travel route. A second embodiment is realized by converting the traffic information based on the first map data into a standard map data format, converting the standard map data format into the format of the second map data, which is used for calculating the travel route, and causing the traffic information to be reflected in the calculation of the travel route. The first and second embodiments will be described in connection with FIG. 5 and FIG. 6, respectively.

FIG. 1 shows a schematic construction of a navigation system to which the present invention is applied. This navigation system has a feature wherein navigation functions are provided via a mobile terminal.

Referring to FIG. 1, the navigation system consists of an information center 100, a wireless network 200, a mobile terminal 330 and an ITS (Intelligent Transportation Systems) terminal 400.

The information center 100 stores map data and real-time traffic information. When a navigation function is requested from the mobile terminal 300, the information center 100 creates the corresponding navigation information referring to the map data and the real-time traffic information stored therein and then provides the navigation information to the mobile terminal 300 through the wireless network 200. For example, the information center 100 creates information for guiding an optimal travel route referring to the map data and the real-time traffic information when the mobile terminal 100 makes a request for guiding the optimal travel route.

The wireless network 200 is an information transmission path between the information center 100 and the mobile terminal 300. As the wireless network 200, communication systems of a PCS (Personal Communication System) type and digital cellular systems of IS-95A, 95B and 95C types may be used. Digital cellular systems of a CDMA (Code Division Multiple Access) type such as IMT-2000 (International Telecommunications 2000) or UMTS (Universal Mobile Telecommunication Systems), which are being widely studied in these days, may be also used as the wireless network 200.

The mobile terminal 300 operates in a navigation mode for supporting the navigation functions as well as in a typical mode for providing phone conversation service to a user. In the navigation mode, the mobile terminal 300 is connected to the wireless network 200, receives various navigation information from the information center 100 and provides the received information to users in cooperation with the information center 100.

In the navigation mode, the user can set the current location of a vehicle and a destination on the mobile terminal 300 and request the information center 100 to guide the optimal travel route, according to which the user can be guided in the optimal travel route by the information center 100. At this time, the user can set an establishment name, a regional category, an administrative section name, a phone number, latitude and longitude designating the destination by way of voice or character input. The user may be also provided with traffic information (e.g., information about a forward area of vehicle travel, city traffic, national roads, highways, favorite sites, etc.) from the information center 100 in the navigation mode. Besides, the user in the navigation mode may be connected to the information center 100 through the mobile terminal 300 to retrieve surrounding establishments (e.g., oil stations, resting places, maintenance centers, banks, hospitals/pharmacies, lodging houses, tourist attractions, restaurants/cafés, theaters/public performance places, etc.), to ask for help in case of emergency and to be provided with living information (news, weather, trip, broadcasting/cinema/play/public performance, fortune, humor, etc.) from the information center 100.

If the user sets the current location of vehicle and a destination in the navigation mode of the mobile terminal 300 and makes a request for an optimal travel route, for example, information in accordance with the user's setting is transmitted to the information center 100 through the wireless network 200. The information center 100 responds to the user's request by calculating the optimal travel route from the current location to the destination with reference to the map data and the real-time traffic information stored therein and providing information of the optimal travel route to the mobile terminal 300 through the wireless network 200. When the information of the optimal travel route is received, the mobile terminal 300 visually and/or audibly provides the received optimal travel route information to the user in cooperation with the ITS terminal 400. At this time, the optimal travel route information to be visually-provided is displayed on a display section of the mobile terminal 300 and the optimal travel route information to be audibly provided is delivered through a speaker of the mobile terminal 300 or the ITS terminal 400 (or both speakers of the mobile terminal 300 and the ITS terminal 400). The optimal travel route information includes guidance direction indication, voice guidance, guidance spots and remaining distance to the destination.

Figure 2:
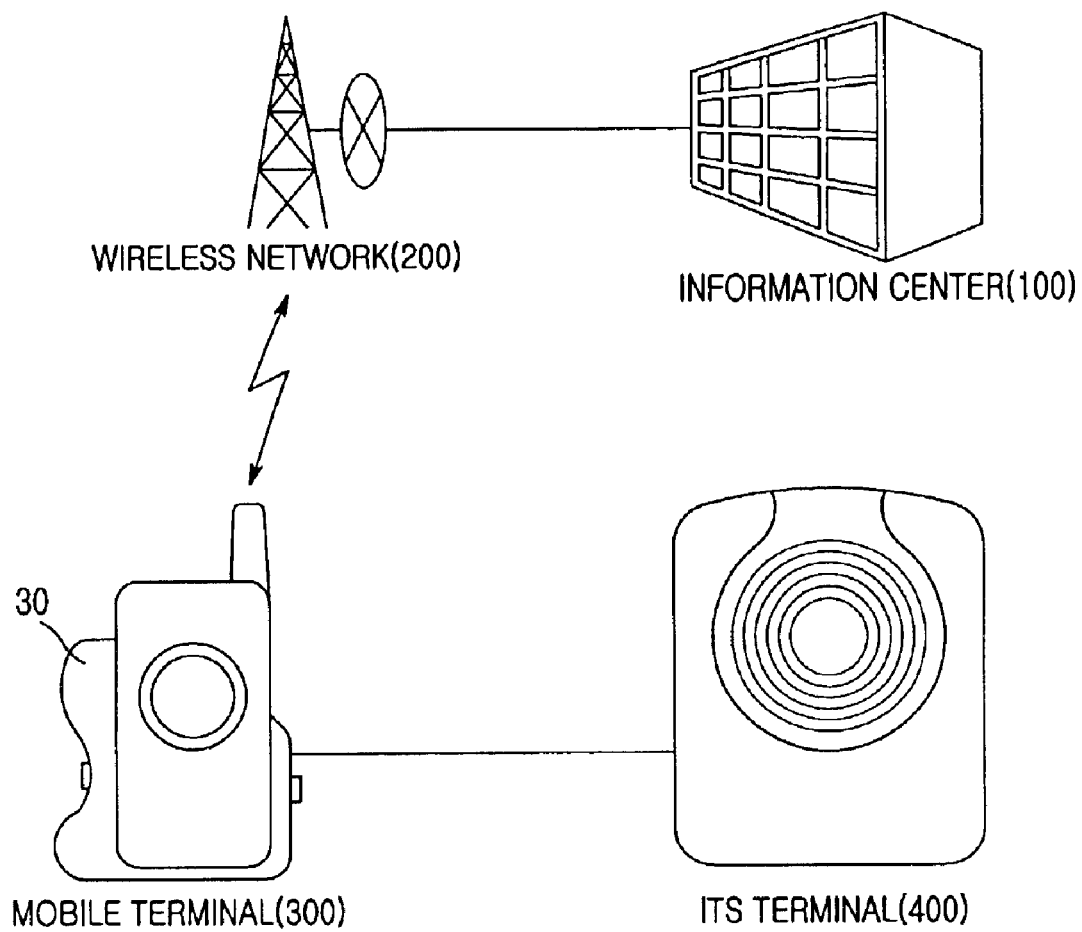
FIG. 2 is a constructional view of one example of the navigation system shown in FIG. 1.
Figure 3:
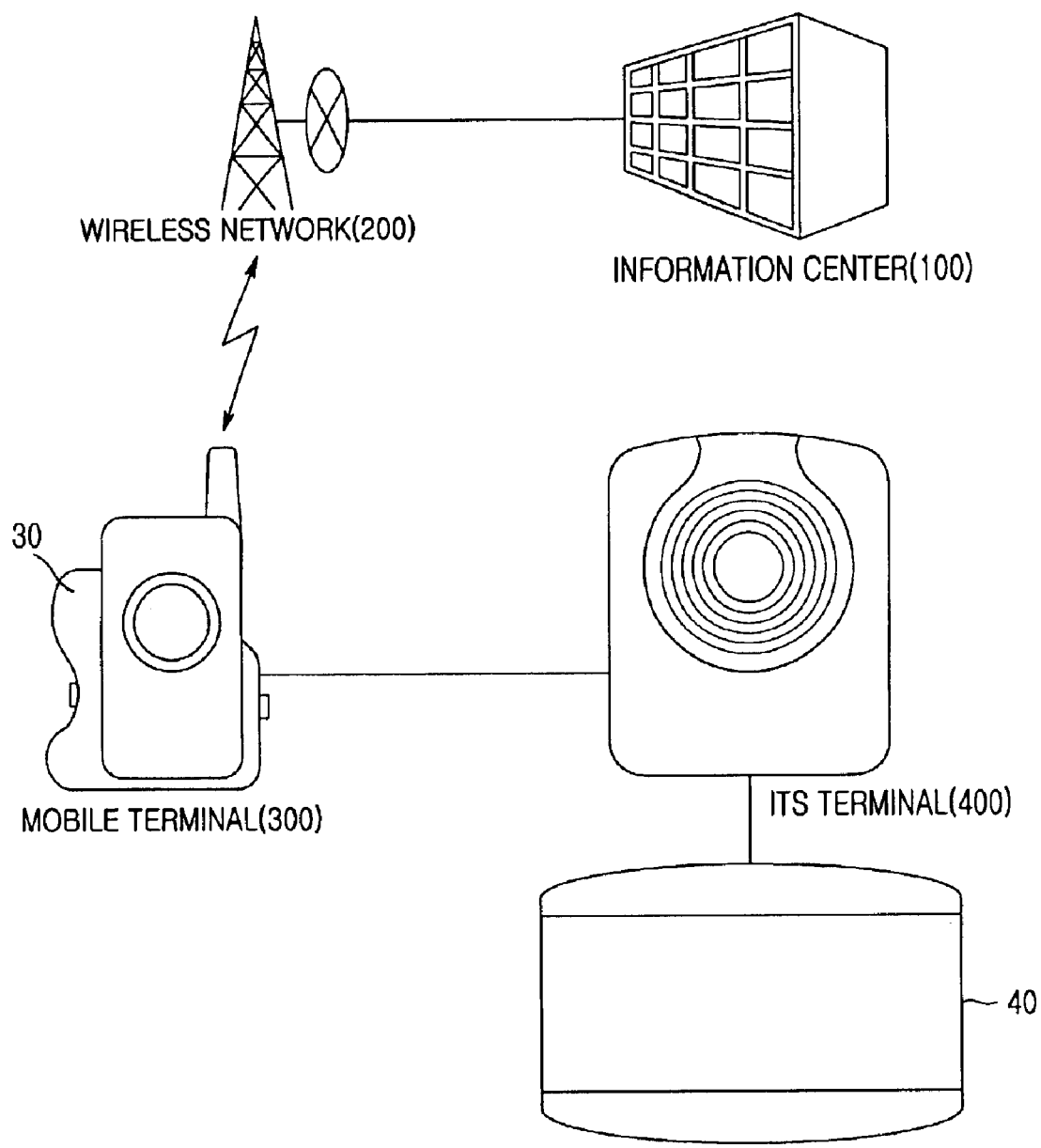
FIG. 3 is a constructional view of another example of the navigation system shown in FIG. 1.

In FIG. 1, the mobile terminal 330 and the ITS terminal 400 may be realized as one terminal for the navigation operation. Considering compatibility with the existing terminals such as cellular phones, however, it is preferred to separately construct the mobile terminal 300 and the ITS terminal 400 as shown the drawings. As shown in FIG. 2 and FIG. 3 for which a description will be given later, the ITS terminal 400 can be connected to the mobile terminal 300 and a TFT-LCD section 40 can be connected to the ITS terminal 400.

FIG. 2 illustrates a construction in accordance with one example of the navigation system shown in FIG. 1.

Referring to FIG. 2, the navigation system includes an information center 100, a wireless network 200, a mobile terminal 300 and an ITS terminal 400. The mobile terminal 300 may be used in a state of being mounted to a cradle 30 in a vehicle. The mobile terminal 300 is connected to the ITS terminal 400. The ITS terminal 400 is connected to the information center 100 via the mobile terminal 300 and the wireless network 200 so as to be provided with navigation functions. The ITS terminal 400 is connected to the information center 100 in cooperation with the mobile terminal 300 and enables a user to be provided with navigation information. The navigation information includes information for guiding a travel route, traffic information, geographical information according to retrieval of surrounding establishments and so forth.

FIG. 3 illustrates a construction in accordance with another example of the navigation system shown in FIG. 1.

Referring to FIG. 3, the navigation system includes an information center 100, a wireless network 200, a mobile terminal 300 and an ITS terminal 400 as the navigation system shown in FIG. 2. A TFT-LCD (Thin Film Transistor-Liquid Crystal Display) 40, however, is mounted to the ITS terminal 400 of the navigation system shown in FIG. 3.

The navigation system shown in FIG. 2 is called a "popular type" navigation system and the navigation system shown in FIG. 3 is called a "high-class type" navigation system. The reason why they are so called is that the TFT-LCD section 40 shown in FIG. 3 is so expensive as to impose a price burden on users purchasing the navigation system which includes the TFT-LCD section 40, but purchase of the navigation system only including the ITS terminal 440 imposes relatively less of a burden on the users.

Figure 4:
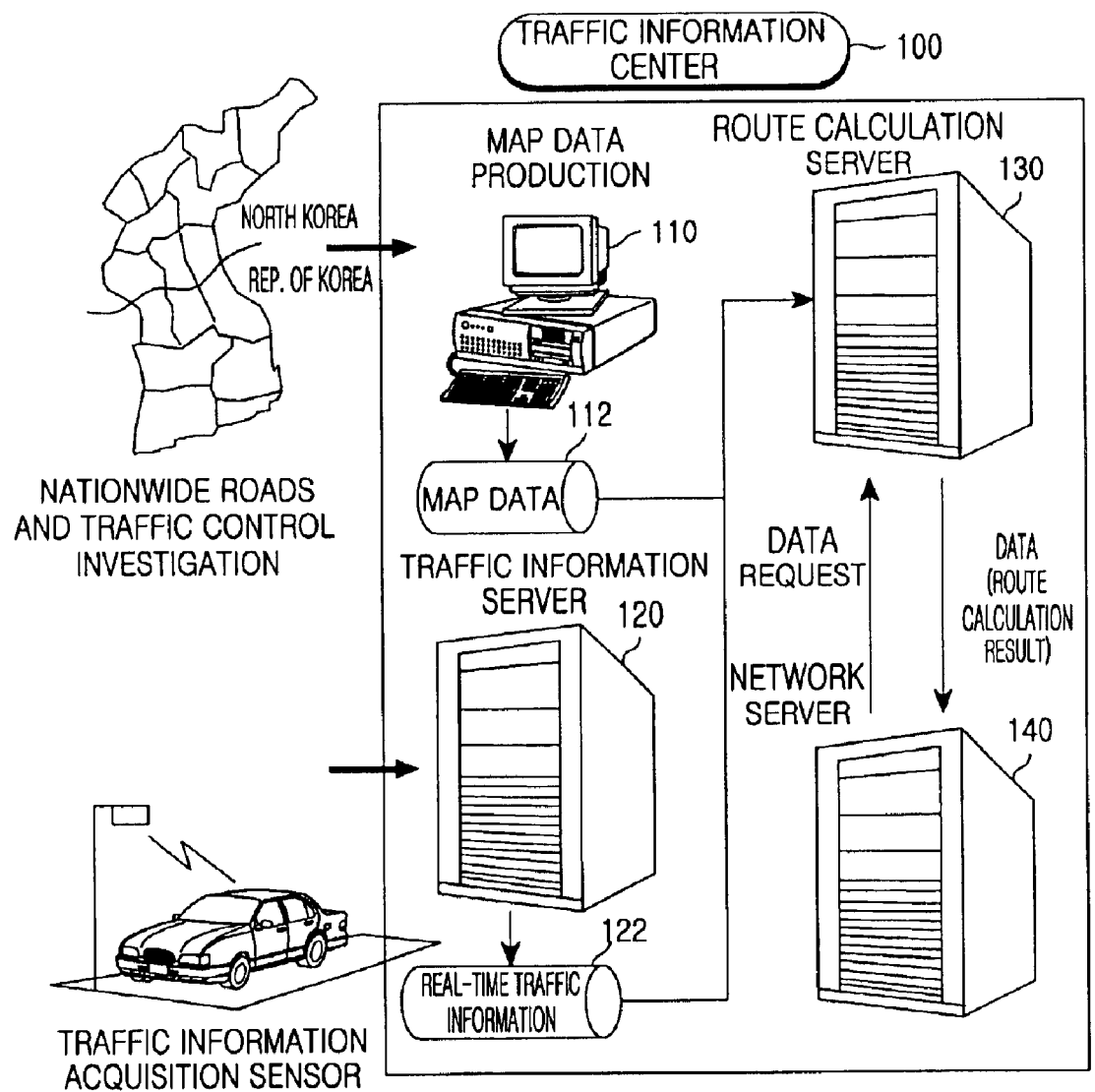
FIG. 4 is a schematic constructional view of an information center (navigation server system) shown in FIG. 1.

FIG. 4 illustrates a schematic construction of the information center (navigation server center) shown in FIG. 1.

Referring to FIG. 4, the information center 100 includes a computer 110, a traffic information server 120, a route calculation server 130, a network server 140, a map data storage section 112 and a real-time traffic information storage section 122. The computer 110 produces map data according to roads and traffic control situations (e.g., nationwide roads, traffic control contents, etc.) having been investigated in advance. The map data produced by the computer 110 is stored in the map data storage section (or map data database) 112. The traffic information server 120 inputs traffic information gathered by a variety of traffic information acquisition (or gathering) sensors to produce real-time traffic information and to store the real-time traffic information in the real-time traffic information storage section 122. Herein, the real-time traffic information means traffic information gathered by various traffic information acquisition sensors which one installed on the roads. For example, the traffic information acquisition sensors periodically detect travel speed on the roads to provide the travel speed to the traffic information server 120, according to which the traffic information server 120 produces traffic information indicating congestion situations of the roads in real time. The route calculation server 130 calculates an optimal route from the current location to a destination to be traveled by a vehicle with reference to the map data and the real-time traffic information stored in the map data storage section 112 and the real-time traffic information storage section 122, respectively and produces information for guiding (inducing) the optimal route according to the calculation result when data is requested by the network server 140. The network server 140 is intended for connection to the wireless network 200.

In this way, the information center 100 stores the map data and the real-time traffic information therein and, with reference to the map data and the real-time traffic information, produces the information for guiding the optimal travel route from the current location to the destination to be traveled by the vehicle in which the mobile terminal 300 is positioned and transmits it to the wireless network 200.

When the mobile terminal 300 transmits information on the current location and the destination to the information center 100, the wireless network 200 is connected to the mobile terminal 300 to provide the transmitted information to the information center 100. The wireless network 200 also provides the information for guiding the optimal travel route from the information center 100 to the mobile terminal 300 when the mobile terminal makes a request for downloading the information. This wireless network 200, intended for wirelessly connecting the mobile terminal 300 to the information center 100 and providing wireless connection service, is realized by the existing digital cellular systems of a CDMA type or PCS systems. IMT 2000, for which much research and development is being widely made lately, may be also used as the wireless network 200.

Figure 5:
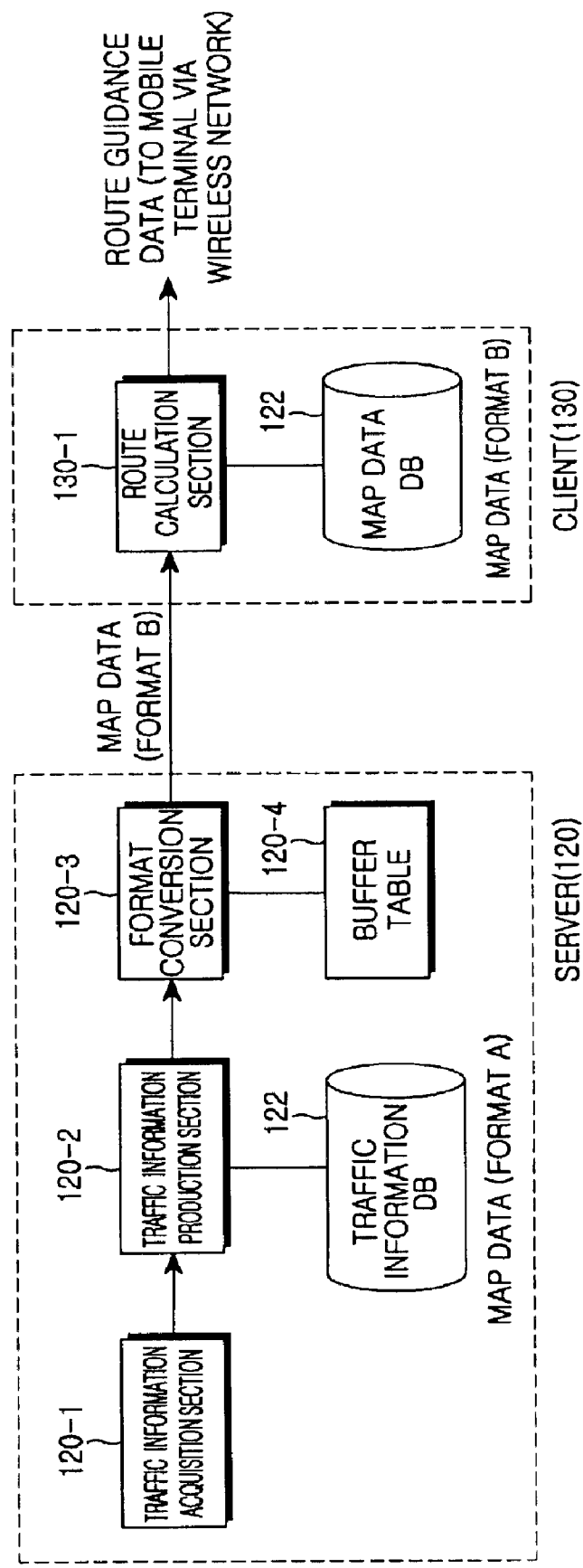
FIG. 5 is a constructional view of the information center in accordance with one embodiment of the present invention.

FIG. 5 shows the information center in accordance with one embodiment of the present invention.

Referring to FIG. 5, the information center 100 is divided into a server for providing real-time traffic information and a client which receives the real-time traffic information from the server. The server means the traffic information server 120 in FIG. 4 and the client means the route calculation server 130 in the same drawing. The traffic information server 120 acquires traffic information to produce the real-time traffic information based on first map data (map data having format A) and to convert the produced traffic information into a second map data (map data having format B) format different from the first map data format. This traffic information server 120 includes a traffic information acquisition section 120-1, a traffic information production section 120-2, a format conversion section 120-3, a buffer table 120-4 and a traffic information database 122.

The traffic information acquisition section 120-1 acquires traffic information from traffic information acquisition sensors (not shown) installed in predetermined positions on roads. The acquired traffic information is information that indicates delay or congestion situations of vehicles in real time by detecting travel speed of the vehicles. The traffic information database 122 stores the map data of format A therein, on the basis of which the traffic information is represented. The traffic information production section 120-2 inputs the traffic information acquired by the traffic information acquisition section 120-1 and produces the real-time traffic information based on the map data having format A. The format conversion section 120-3 converts the traffic information produced by the traffic information production section 120-2 into the format of map data having format B. In converting the format, the format conversion section 120-3 refers to items stored in the buffer table 120-4. Such reference items include a link, node information and vehicle travel information.

The route calculation server 130 includes a route calculation section 130-1 and a map data database 130-2. The map data database 130-2 stores the map data having format B therein. The route calculation section 130-1 causes the format-converted traffic information to be reflected in the second map data, and calculates and provides the optimal travel route based on the second map data, in which the acquired traffic information is reflected, when a subscriber makes a request for the travel route. The route guidance data, which indicates the optimal travel route calculated by the route calculation section 130-1, is provided to the subscriber of the mobile terminal 300 through the wireless network 200.

In the navigation system as shown in FIG. 5 and stated above, summary operations for processing the real-time traffic information are as follows:

The traffic information production section 120-2 of the traffic information server 120 receives the traffic information acquired by the traffic information acquisition section 120-1 and produces traffic information based on the first map data (map data having format A) (Step 1).

The format conversion section 120-3 of the traffic information server 120 converts the traffic information produced by the traffic information production section 120-1 into the second map data format (format B) (Step 2).

The route calculation section 130-1 of the route calculation server 130 causes the format-converted traffic information to be reflected in the second map data stored in the map data database 130-2, and calculates an optimal travel route based on the second map data, in which the acquired traffic information is reflected, when a request is made for the travel route (Step 3).

Figure 6:
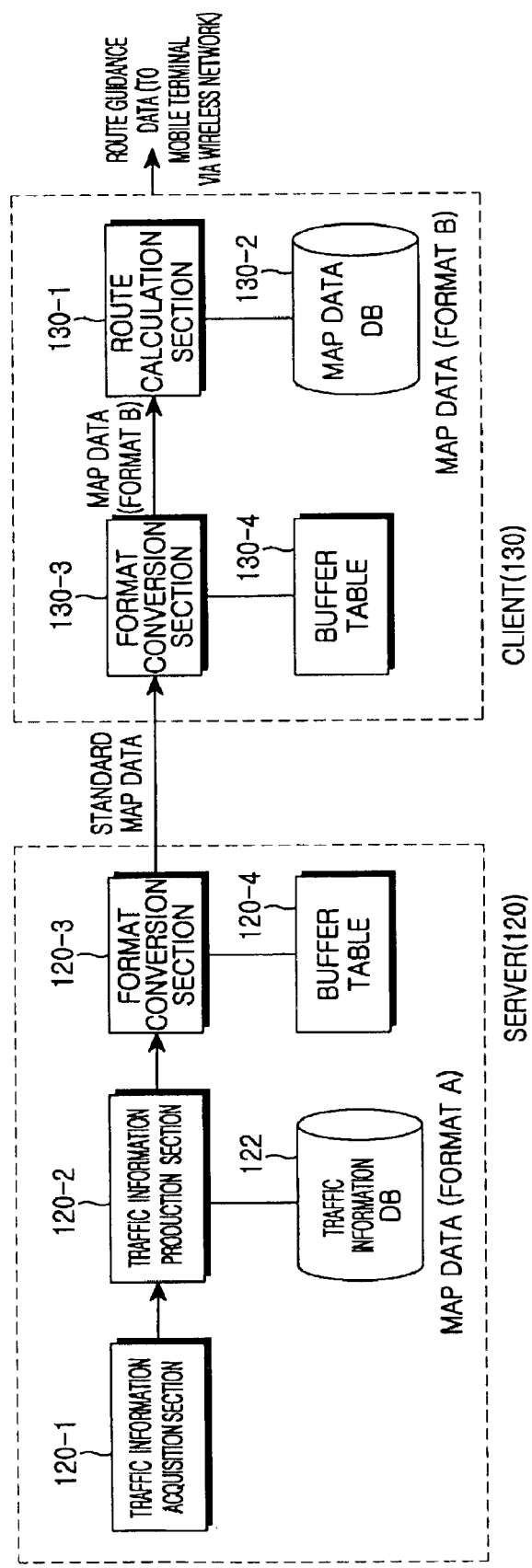
FIG. 6 is a constructional view of the information center in accordance with another embodiment of the present invention.

FIG. 6 shows the information center in accordance with another embodiment of the present invention.

Referring to FIG. 6, the information center 100 is divided into a server for providing real-time traffic information and a client which receives the real-time traffic information from the server. The server means the traffic information server 120 in FIG. 4 and the client means the route calculation server 130 in the same drawing. The traffic information server 120 acquires traffic information to produce the real-time traffic information based on first map data (map data having format A) and to convert the produced traffic information into a standard map data format. This traffic information server 120 includes a traffic information acquisition section 120-1, a traffic information production section 120-2, a format conversion section 120-3, a buffer table 120-4 and a traffic information database 122.

The traffic information acquisition section 120-1 acquires traffic information from traffic information acquisition sensors (not shown) installed in predetermined positions on roads. The acquired traffic information is information that indicates delay or congestion situations of vehicles in real time by detecting travel speed of the vehicles. The traffic information database 122 stores the map data of format A therein, on the basis of which the traffic information is represented. The traffic information production section 120-2 inputs the traffic information acquired by the traffic information acquisition section 120-1 and produces the real-time traffic information based on the map data having format A. The format conversion section 120-3 converts the traffic information produced by the traffic information production section 120-2 into the standard map data format. In converting the format, the format conversion section 120-3 refers to items stored in the buffer table 120-4. Such reference items include a link, node information and vehicle travel information.

The route calculation server 130 includes a route calculation section 130-1, a map data database 130-2, a format conversion section 130-3 and a buffer table 130-4. The map data database 130-2 stores the map data having format B therein. The format conversion section 130-3 converts the traffic information, which is converted into the standard map data format, into the format of the map data having format B. In converting the format, the format conversion section 130-3 refers to items stored in the buffer table 130-4. Such reference items include a link, node information and vehicle travel information. The route calculation section 130-1 causes the traffic information, which is format-converted into the map data having format B, to be reflected in the map data having format B, and calculates and provides the optimal travel route based on the map data having format B, in which the acquired traffic information is reflected, when a subscriber makes a request for the travel route. The route guidance data, which indicates the optimal travel route calculated by the route calculation section 130-1, is provided to the subscriber of the mobile terminal 300 through the wireless network 200.

In the navigation system as shown in FIG. 6 and stated above, summary operations for processing the real-time traffic information are as follows:

The traffic information production section 120-2 of the traffic information server 120 receives the traffic information acquired by the traffic information acquisition section 120-1 and produces traffic information based on the first map data (map data having format A) (Step 1).

The format conversion section 120-3 of the traffic information server 120 converts the traffic information produced by the traffic information production section 120-1 into the standard map data format (Step 2).

The format conversion section 130-3 of the route calculation server 130 converts the traffic information, format-converted into the standard map data format, into the second map data format (format B) (Step 3).

The route calculation section 130-1 of the route calculation server 130 causes the traffic information converted into the second map data format to be reflected in the second map data stored in the map data database 130-2 and calculates an optimal travel route, based on the second map data in which the acquired traffic information is reflected, when a request is made for the travel route (Step 4).

In the navigation systems of a server-client construction as shown in FIG. 5 and FIG. 6, the client performs the steps of causing the traffic information to be reflected in the existing route calculation data and calculating the travel route, and the server performs the steps of acquiring and processing the traffic information. Accordingly, the data format used in the traffic information acquisition step is generally different from that used in the route calculation step. Although the data format used in the step of gathering the traffic information is generally different from that used in the step of using the acquired traffic information for the route calculation as stated above, the present invention uses a standardized format between the format used in the traffic information acquisition step and the format used in the route calculation step to make it possible to process the traffic information, even when the traffic information acquisition format is changed on one hand or the route calculation format is changed on the other hand, without any further modification if only the buffer tables 120-4, 130-4 are amended.

In the navigation system which represents road information using a link and a node, the buffer table is constructed in such a manner that, in a case when the link does not exactly coincide with the node, a specified area (e.g., Seoul City Hall) is expressed as a link (no. 100) and nodes (A-B) on the traffic information processing side, but it can be differently expressed as a link (no. 12345678) and nodes (a12345, b1234) in the route calculation step. In this case, the buffer table may be constructed as shown in Table 1 and Table 2 below. Table 1 illustrates an example of the so-constructed buffer table (buffer table for traffic information processing) 120-4 in FIG. 6 and Table 2 illustrates an example of the so-constructed buffer table (buffer table for route calculation processing) 130-4 in the same drawing.

TABLE 1

| Traffic information link | Name | Standardized link | Standardized node | Vehicle travel information |
|---|---|---|---|---|
| 100 | Seoul City Hall | Link 1 | Node A-Node B | 10 km |
| 110 | Kwang- whamun | Link 2 | Node C-Node D | 20 km |
| . . . | . . . | . . . | . . . | . . . |

TABLE 2

| Traffic information link | Name | Standardized link | Standardized node | Vehicle travel information |
|---|---|---|---|---|
| Link 1 | Node A | 12345678 | a1234-b1234 | 10 km |
| Link 2 | Node B | 12345600 | a5678-b5678 | 20 km |
| . . . | . . . | . . . | . . . | . . . |

If the buffer tables as shown in Table 1 and table 2 exist, the information necessary for the route calculation step can be read and processed in the buffer table for route calculation processing. Although the link, the node information and the vehicle travel information in the buffer table for traffic information processing may not necessarily coincide with those in the buffer table for route calculation processing, the buffer tables include all the information required for calculating the travel route by the navigation terminal.

The present invention as described above is advantageous in that a format of map data for calculating a travel route and a format of map data for representing traffic information are so processed as to coincide with each other, which enables the optimal travel route reflecting the real-time traffic information to be calculated even when one of the map data formats does not coincide with the other due to conversion or upgrading of the map data in a navigation system providing the real-time traffic information. In particular, the present invention has an advantage in that the traffic information is so processed as to be reflected in the format of each map data for calculating the travel route even in a case when there exists one format of the map data for representing the traffic information and there exist plural formats of the map data for calculating the travel route like in a case when there is a single provider of the real-time traffic information and there are multiple providers of the map data for calculating the travel route.

While the invention has been shown and described with reference to certain preferred embodiments thereof, it will be understood by those skilled in the art that various changes in form and details may be made therein without departing from the spirit and scope of the invention. As already described above, the embodiments of the invention have been described only by way of examples which are applied to the navigation system consisting of the information center, the wireless network, the mobile terminal and the ITS terminal as shown in FIG. 1. Note that the technical spirit of the invention applied to the embodiments may be similarly accomplished in typical navigation systems which have the map data therein and are provided with the real-time traffic information by radio or cable. Consequently, the scope of the invention should not be limited to the embodiments, but should be defined by the appended claims and equivalents thereof.

What is claimed is:

1. A method for using real-time traffic information for calculating a travel route in a navigation system comprising the steps of:
   receiving acquired traffic information and creating real-time traffic information based on first map data using the acquired traffic information;
   converting the created real-time traffic information into a second map data format different from a first map data format;
   reflecting the converted real-time traffic information to second map data; and
   calculating an optimal travel route based on the second map data in which the converted real-time traffic information is reflected.

2. A navigation server system for providing navigation functions to users connected thereto through a communication network comprising:
   a traffic information server for acquiring traffic information, producing real-time traffic information based on first map data using the acquired traffic information and converting the real-time traffic information into a second map data format different from a first map data format; and
   a route calculation server for reflecting the converted real-time traffic information to second map data stored in a database of the route calculation server, calculating an optimal travel route based and the second map data, and providing the optimal travel route to a subscriber when the subscriber requests the travel route.

3. A navigation server system according to claim 2, wherein the communication network is a wireless network.

4. A navigation server system according to claim 2, wherein the traffic information server comprises:
   a traffic information acquisition section for acquiring the traffic information;
   a real-time traffic information production section for producing the real-time traffic information based on the first map data using the traffic information; and
   a format conversion section for converting the real-time traffic information into the second map data format.

5. A navigation server system according to claim 4, wherein the traffic information server further includes a table for storing items to be referred to when the format conversion section performs the format conversion.

6. A navigation server system according to claim 5, wherein the stored items include a link, node information and vehicle travel information.

7. A navigation server system according to claim 2, wherein the route calculation server comprises:

a database in which the second map data is stored; and a route calculation section for reflecting the converted real-time traffic information to second map data, calculating an optimal travel route based on the second map data, and providing the optimal travel route to a subscriber when the subscriber requests the travel route.

8. A method for using real-time traffic information for calculating a travel route in a navigation system comprising the steps of:

receiving acquired traffic information and creating traffic information based on first map data using the acquired traffic data;

converting the traffic information into a standard map data format;

converting the traffic information into a second map data format different from a first map data format;

reflecting the traffic information to second map data stored in a database stored in a database of a route calculation server; and calculating an optimal travel route based on the second map data in which the traffic information is reflected when the travel route is requested.

9. A navigation server system for providing navigation functions to users connected thereto through a communication network comprising:

a traffic information server for acquiring traffic information, producing real-time traffic information based on first map data using the acquired traffic data and converting the real-time traffic information into a standard map data format traffic information; and a route calculation server for converting the standard map data format traffic information into a second map data format traffic information different from a first map data format, reflecting the second map data format traffic information to second map, calculating an optimal travel route based on the converted traffic information and the second map data in which the acquired traffic information is reflected, and providing the optimal travel route to a subscriber when the subscriber requests the travel route.

10. A navigation server system according to claim 9, wherein the communication network is a wireless network.

11. A navigation server system according to claim 9, wherein the traffic information server comprises:

a traffic information acquisition section for acquiring the traffic information;

a real-time traffic information production section for producing the real-time traffic information based on the first map data using the traffic information; and a format conversion section for converting the real-time traffic information into the standard map data format traffic information.

12. A navigation server system according to claim 11, wherein the traffic information server further includes a table for storing items to be referred to when the format conversion section performs the format conversion.

13. A navigation server system according to claim 12, wherein the stored items include a link, node information and vehicle travel information.

14. A navigation server system according to claim 9, wherein the route calculation server comprises:

a database in which the second map data is stored;

a format conversion section for converting the standard map data format traffic information into the second map data format traffic information; and a route calculation section for reflecting the second map data format traffic information to second map data stored in a database of the route calculation server, calculating an optimal travel route based on the second map data and providing the optimal travel route to a subscriber when the subscriber requests the travel route.

15. A navigation server system according to claim 14, wherein the traffic information server further includes a table for storing items to be referred to when the format conversion section performs the format conversion.

16. A navigation server system according to claim 15, wherein the stored items include a link, node information and vehicle travel information.

* * * * *